United States Patent [19]

Farris

[11] 4,357,041
[45] Nov. 2, 1982

[54] ELASTOMERIC ENERGY ABSORBING SYSTEM

[75] Inventor: Richard J. Farris, Northampton, Mass.

[73] Assignees: James C. W. Chien; William J. MacKnight, both of Amherst, Mass.; part interest to each

[21] Appl. No.: 156,923

[22] Filed: Jun. 6, 1980

[51] Int. Cl.³ .............................................. B61F 19/04
[52] U.S. Cl. ....................................... 293/136; 267/140
[58] Field of Search ............... 293/133, 135, 136, 137; 267/140, 141

[56] References Cited

U.S. PATENT DOCUMENTS

| | | | |
|---|---|---|---|
| 1,783,335 | 2/1930 | Laher | 293/136 |
| 2,075,746 | 3/1937 | Neiman | 267/21 |
| 2,186,137 | 1/1940 | Halladay | 293/55 |
| 2,903,289 | 9/1959 | Klix | 293/72 |
| 3,603,633 | 9/1971 | Eshelman | 293/19 |
| 3,694,018 | 9/1972 | Levering | 267/140 |
| 3,694,019 | 9/1972 | Carter | 293/133 |
| 3,734,554 | 5/1973 | Schwabenlender | 293/136 |
| 3,794,367 | 2/1974 | Siessor | 293/88 |
| 3,834,686 | 9/1974 | Moritz | 267/116 |
| 3,854,765 | 12/1974 | Church | 293/88 |
| 3,883,127 | 5/1975 | Schwarz | 267/140 |
| 3,904,458 | 9/1975 | Wray | 156/85 |
| 4,046,411 | 9/1977 | Richard | 293/136 |
| 4,063,713 | 12/1977 | Anolick | 293/136 |
| 4,076,226 | 2/1978 | Anolick | 267/139 |
| 4,149,742 | 4/1979 | Fannin | 298/121 |

FOREIGN PATENT DOCUMENTS 607677 7/1926 France.
1347000 2/1974 United Kingdom.

Primary Examiner—Joseph F. Peters, Jr.
Assistant Examiner—John A. Carroll
Attorney, Agent, or Firm—Robert Shaw

[57] ABSTRACT

An energy absorber in which impact energy is converted into heat and stored elastic energy in a multitude of individual elastomeric fibers or the like which are disposed individually in tension about a plurality of mechanical members that are moved by the impact to effect distortion of the fibers or the like and provide energy dissipation and containment.

35 Claims, 7 Drawing Figures

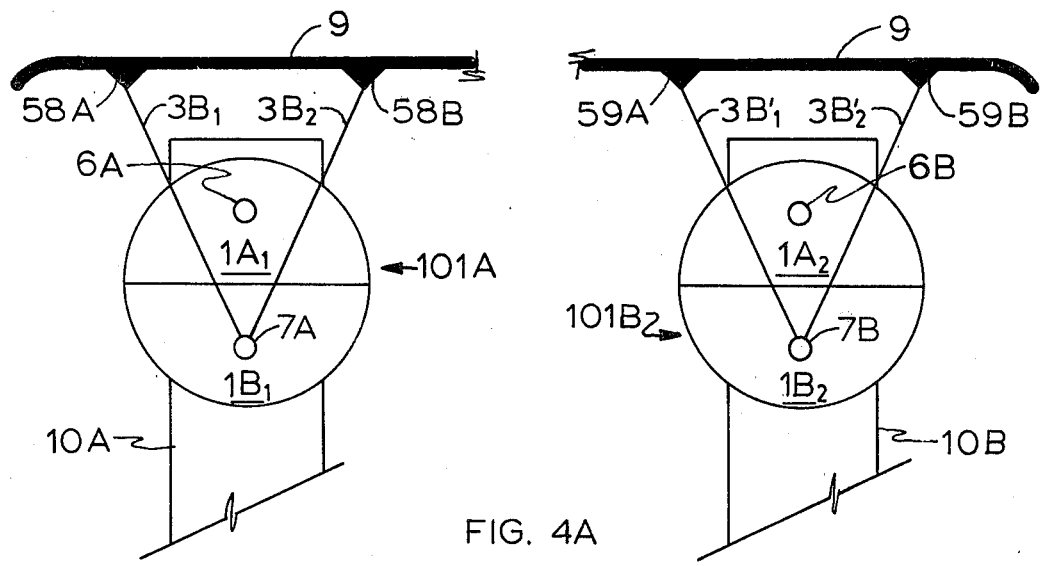
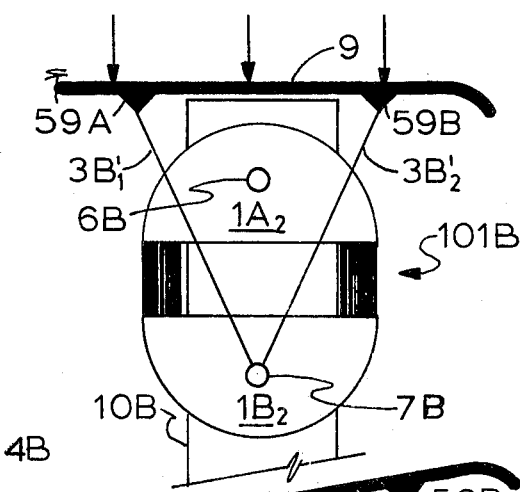
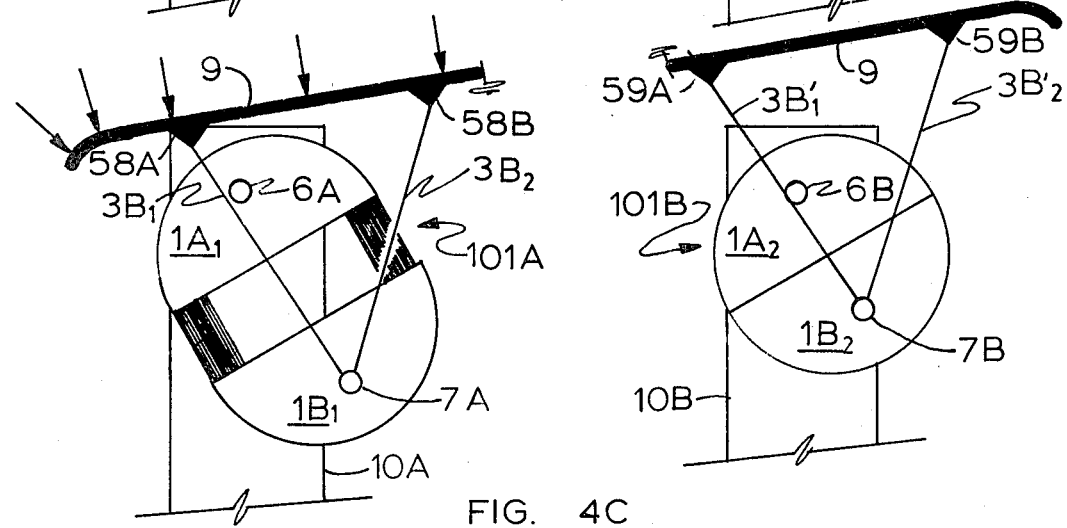
FIG. 4A
FIG. 4B
FIG. 4C

ELASTOMERIC ENERGY ABSORBING SYSTEM

The present invention relates to devices for absorbing impact energy encountered in motor vehicles, trains and the like as well as other systems.

By way of background, attention is called to French Pat. No. 607,677; British Pat. No. 1,347,000; and U.S. Pat. Nos. 3,834,686; 1,783,335; 2,075,746; 2,186,137; 2,903,289; 3,603,633; 3,694,018; 3,694,019; 3,734,554; 3,794,367; 3,854,765; 3,883,127; 3,904,458; 4,046,411; 4,063,713; 4,076,226 and 4,149,742.

Although the present invention has use in other systems than moving vehicles and in other vehicles than automobiles, it is explained herein, to simplify discussion of the principles involved, in the context of use as part of an automobile bumper system.

Federal motor vehicle safety standards for exterior protection of passenger cars specify protection at five miles per hour for the front bumper and two to three miles per hour for the rear bumper. Even so, automobile manufacturers have had difficulty meeting this modest standard with currently available telescopic energy absorbing devices. Such telescopic devices, besides their oftentimes inadequate performance, tend to be quite massive and have countered attempts at vehicle weight reduction to reduce fuel consumption, are not adapted to accommodate transverse forces and have high maintenance cost, among other things. Thus, for example, the steel springs used in some designs are heavy and have poor energy absorbing qualities; hydraulic systems require close tolerances (i.e., high cost); and both are essentially limited to longitudinal motion with small use for angular or transverse components of motion.

Similar remarks apply to available impact absorbers having telescopic members and elastomer to absorb energy; essentially what has been done is that the springs and hydraulic systems have been replaced by elastomer belts wrapped around pins. Nevertheless, the requirement for precision (with costly manufacturing procedure), high maintenance cost, ability to absorb longitudinal forces only, and so forth, remain, with the additional problem of belt fracture.

Accordingly, it is an object of the present invention to provide an energy absorber for use in automobiles and the like, as part of the bumper systems thereof, an absorber that, though light in weight and economical to build, nevertheless can be made to absorb energy within and even beyond the present Federal standards.

Another object is to provide an energy absorber which is compact.

Another object is to provide an energy absorber which is effective to dissipate both head-on (i.e., longitudinal) forces and lateral (i.e., transverse) forces.

Still another object is to provide an absorber which can, within reasonable limits, absorb impact energy up to and exceeding the Federal limit requirements without being destroyed thereby.

A further object is to provide an absorber which does not require moving metallic parts demanding high precision.

A further object is to provide an absorber that can operate over a large range of velocities and is not greatly velocity sensitive.

A further object is to provide an absorber which employs many elastomeric fibers in tension and which can be tailored to display predetermined deceleration rates (i.e., force/deflection characteristics) by applying determined tension on the fibers and/or using fibers with appropriate tension v. energy dissipation characteristics.

A further object is to provide an energy absorber that is functional over a wide range of temperature.

A further object is to provide an energy absorber for motor vehicles, whose ultimate capacity far exceeds most low-speed impact forces encountered by such vehicles, an absorber that has sufficient static retention or rigidity to maintain bumpers and the like in position.

These and still further objects are addressed hereinafter.

The foregoing objects are achieved, generally, in an energy absorbing device comprising two juxtaposed mechanical members that can move into physical contact with one another and away from such physical contact. In their usual relative positioning, the two mechanical members are maintained in facing contact with one another by elastomeric fibers and the like disposed in tension about the two mechanical members. Means is provided to transmit impact forces to the two members in a way that tends to separate the two mechanical members from one another and thus stretch the elastomeric fibers and the like which are adapted, in the course of being stretched (as well as upon relaxing or retracting) to convert the impact energy to heat and stored elastic energy in order to absorb impact energy. Typically there is a multitude of single turns of the elastomeric fibers wound in tension about the members, and the thin fibers and the like are formed of a material that when deformed under tension has a very large energy absorbing capacity over the temperature and velocity ranges of expected use. In the usual installation, two such devices are employed to secure a bumper of a vehicle to the frame thereof. The two devices provide the sole support for the bumper; hence, the elastomeric fibers and the like must provide sufficient tensile force to maintain the bumper in its normal position as well as to absorb impact.

The invention is hereinafter explained with reference to the accompanying drawing in which:

FIG. 4A shows diagrammatically two energy absorbers, like the energy absorber of FIG. 1, pivotally attached to the bumper of an automobile and to the frame thereof in a manner to effect impact energy absorption, the two absorbers being disposed in their normal unstressed condition;

FIG. 4B shows diagrammatically the energy absorbers of FIG. 4A when subjected to longitudinal impact forces; and FIG. 4C shows diagrammatically the energy absorbers of FIG. 4A when subjected to transverse impact forces.

Figure 1:
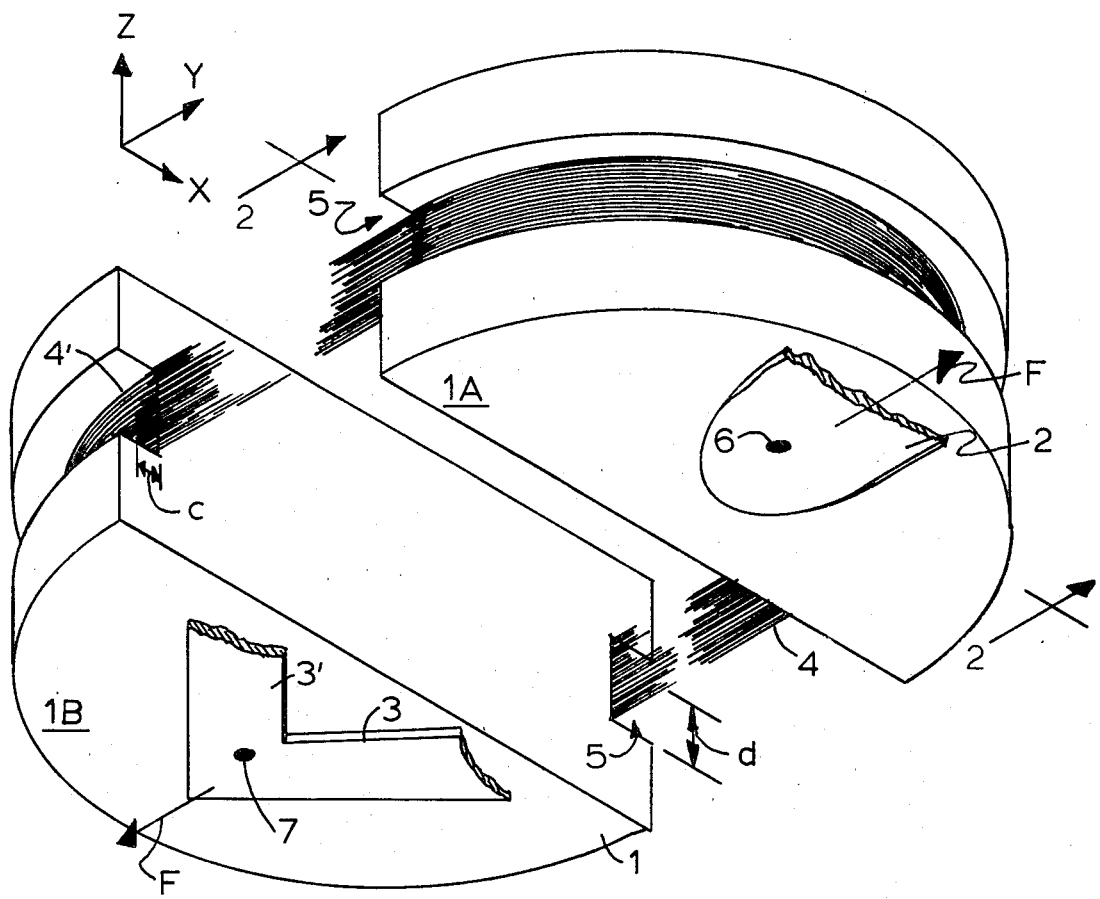
FIG. 1 is an isometric view of an energy absorber employing the present inventive concepts.

Some preliminary comments of a general nature are appropriate at this juncture. The energy absorbing device marked 101 in FIG. 1 is one form the present invention can take. It consists of a mechanical core 1 and elastomeric fibers or filaments 4 that form a winding 4' disposed in the circumferential or peripheral closed-loop slot or recess shown at 5 of the core or spool 1. The core 1 consists of two identical half spools 1A and 1B which ordinarily are in the facing juxtaposed or abutting relationship shown in FIG. 4A (discussed below) wherein two energy absorbing devices 101A and 101B are shown comprising spools $1A_1$ and $1B_1$ and $1A_2$ and $1B_2$, respectively. The devices 101A and 101B are shown attached to the front of an automobile to absorb impact energy when, for example, the front bumper strikes an object. The device 101 in FIG. 1 is now explained in that context, the forces F in FIG. 1 being produced by such impact; it is assumed, for simplicity, that the device 101 is the left device, i.e., the device 101A in FIGS. 4A–4C.

Figure 2:
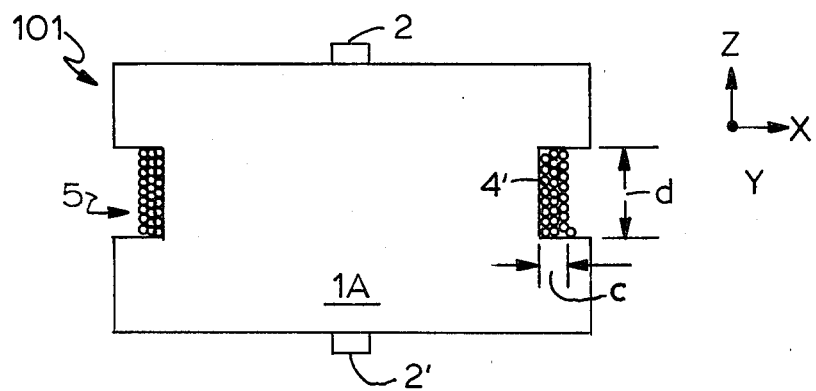
FIG. 2 is a view taken upon the lines 2—2 in FIG. 1 looking in the direction of the arrows.

The energy absorbing device 101 in FIGS. 1 and 2 is pivotally attached to the front frame of an automobile by structures 2 and 2' and to the front bumper by a structure having arms 3 and 3' (two pivotally secured arms, like 3 and 3', may be provided at the reverse side of the member 1B). A pin 6 serves as a pivot for the member 2 and a pin 7 serves as a pivot for the arms 3 and 3'. Fore to aft impact on the front bumper produces the force F in FIG. 1 which causes rearward movement (in the minus y-direction) of the member 1B; the force F is transmitted from the front bumper by the arms 3 and 3' to the member 1B. The member 1A is secured to the automobile frame and hence has no fore and aft (y-direction) movement. As the member 1B moves rearward, under impact, the impact energy is absorbed by the fibers 4 as heat energy and as stored elastic energy in the fibers as they stretch. The material of which the elastomeric fibers 4 are formed is chosen to have high hysteresis to effect large heat losses.

Figure 3B:
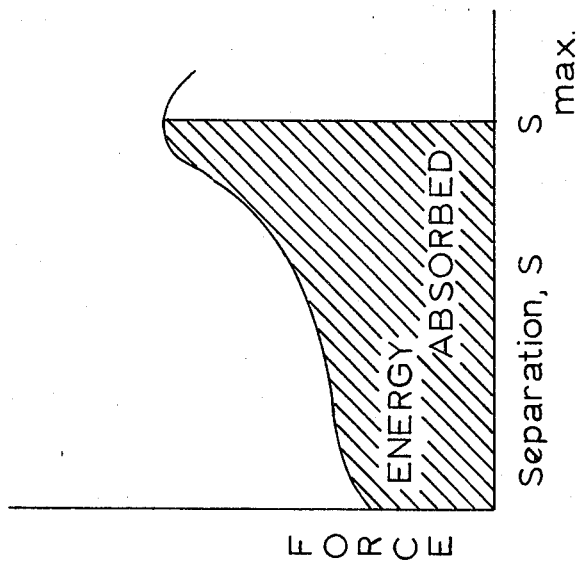
FIG. 3A is a top view of an absorber, like the absorber of FIG. 1, for use in conjunction with the energy absorption diagram in FIG. 3B.
Figure 3A:
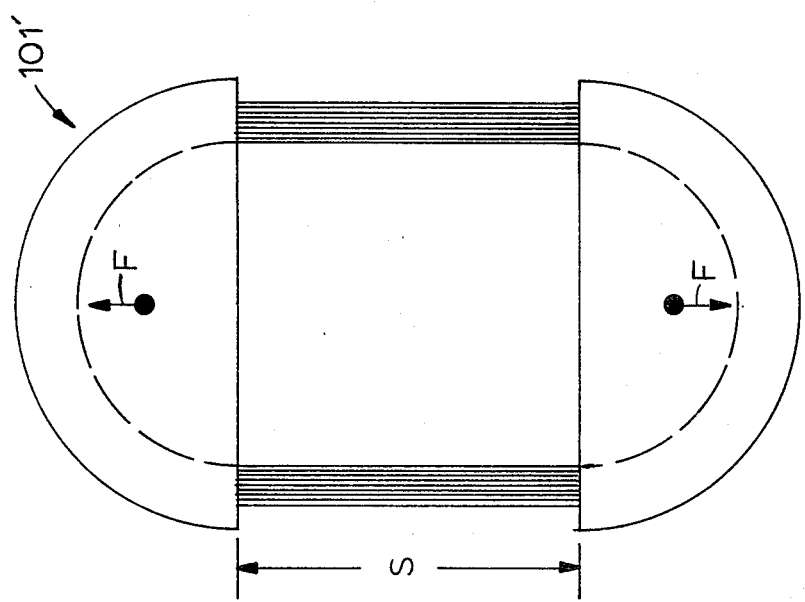

It is important in many applications, as above indicated, that the elastomer used have high hysteresis losses (see FIG. 3B hereof which shows energy absorption, with respect to the device marked 101' in FIG. 3A, as a function of separation distance S) to minimize the rebound energy, and that it have the high stiffness, strength and deformation needed to absorb the impact. In work done to date, the elastomer found most efficacious for present purposes is the polyurethane elastomeric fiber called Lycra (marketed by I. E. Dupont de Nemours and Company). There are several commercially available elastomeric fibers made from both natural and synthetic rubbers that also function well in these designs. Whereas the so-called "spandex" polyurethane-block copolymers of the Lycra variety are the most efficient in terms of capacity per pound, they are currently the most expensive. For automotive applications, use of a larger mass of less efficient and less expensive fiber could prove most cost efficient.

The elastomeric fibers 4 are wound in tension (also called "pre-tension" herein) as many single turns (thousands of individual fibers or single turns) with the closed-loop recess or indentation 5 to form a winding 4' whose cross dimensions c and d in FIGS. 1 and 2 are many times greater than the cross dimensions of the individual fibers. Typically the dimensions c and d are more than 10 to 100 times the cross dimensions of the individual fibers. By way of example, the dimensions c and d may be one to two centimeters whereas each fiber may be in the range from about 50 to 2,500 denier.

Elsewhere herein, two devices, like the device 101, are discussed in the context of an automobile bumper system. It is noted that the elastomeric fibers in cooperation with the two mechanical members must secure the bumper to the automobile frame, and the fibers provide the sole linking support for the bumper to maintain it in position against the forces of gravity. Thus, the tensile force supplied by the fibers must be great enough to maintain the bumper in place, that is, the tension of the fibers must be sufficient to maintain high enough contact pressure between the two juxaposed mechanical members so that they act as a rigid piece about the transverse axis with respect to moments and forces exerted by the bumper weight. On the other hand, there must be sufficient stretch remaining in the fibers to permit the half spools 1A and 1B to separate on impact an adequate distance for the impact energy to be absorbed without excessive tensile stresses and strains that could result in fracture of the fibers. The isometric drawing, in FIG. 1, is a full scale representation of an actual energy-absorbing device. It can be seen that the length of a single turn of fiber wound under pre-tension in the unseparated configuration is much less than the length of that same fiber when separation occurs because of the influence of impact forces. There is, then, an important relationship with respect to the length of a single turn of fiber under pre-tension, the magnitude of such pre-tension, the expected maximum elongation of the fibers during impact, and the material of which the elastomeric fibers are formed.

Use of many fine denier fibers 4 has a number of distinct advantages. The multiple fibers permit somewhat even distribution of stresses throughout the elastomeric winding 4' so that fracture of a few or even many fibers does not result in failure of the device 101; and a very precise predetermined tension can be provided within the device 101. The device 101 is a simple design, it has low initial cost, instantaneous energy absorption, light weight, reliability, high impact-absorbing capacity, it is tunable in terms of force deformation capability, and it can absorb both longitudinal and lateral impact.

In addition to the facets discussed above, elastomeric fibers are by far the most effective materials for available energy absorption. Theory suggests that the tremendous strain-energy capacity of such fibers, assembled into suitable configurations, can be designed into low cost, light-weight bumper components that absorb in excess of 20,000 ft-lbs of energy per pound of fiber. That theory has been shown to be true by the present inventor who has tested devices of the type shown in FIG. 1 consisting of elastomeric fibers wrapped under pre-tension about split spools in the manner discussed above.

To place this explanation in context, the specific elastic strain energy capacity for a few materials is given in Table I below:

TABLE I

| Material | Joules/gram | Foot-pounds/pound |
|---|---|---|
| Cast iron | .0011 | 0.37 |
| Soft steel | .0092 | 3.1 |
| Phosphor Bronze | .012 | 4.1 |
| Rolled Aluminum | .023 | 7.6 |
| Spring steel (tension) | .285 | 95.4 |
| Spring steel (torsion) | .142 | 47.7 |
| Spring steel (bending) | .095 | 31.8 |
| Hickory wood | .366 | 123.0 |
| Vulcanized natural rubber | 44.000 | 14,700.0 |
| Polyurethane fiber (Lycra) | 90.000 | 30,000.0 |

As mentioned above and as shown in FIGS. 4A–4C, the energy absorption devices 101A and 101B are pivotally attached to the frame of an automobile and to the bumpers thereof. In these figures the members $1A_1$ and $1A_2$ are pivotally secured to frame structures 10A and 10B of the automobile by pins 6A and 6B, respectively. The members 1B$_1$ and 1B$_2$ are attached to the bumper labeled 9 by the rods 3B$_1$ and 3B$_2$, 3B$_1'$-3B$_2'$ by pins 7A and 7B, respectively; this attachment need not be pivotal. The tie rods 3B$_1$, 3B$_2$, 3B$_1'$ and 3B$_2'$ are attached to the bumper 9 by welds or the like 58A, 58B, 59A and 59B, as shown in FIGS. 4A–4C. The bumper 9 may be the front bumper or the rear bumper. It should be understood, however, that the elastomeric fibers must provide support for the bumper 9 during nonimpact or normal conditions since the devices 101A and 101B are the only mechanism securing the bumper 9 to the automobile frame, that is, the sole support for the bumper 9 is provided by the elastomeric fibers which must provide sufficient tensile force to maintain the bumper in place. During the transient condition of impact as shown in FIGS. 4B (longitudinally-directed impact) and 4C (laterally-directed impact) momentum will keep the bumper 9 from dropping due to gravitational forces; if the transient condition is removed, the devices 101A and 101B will revert to the condition shown in FIG. 4A from either the longitudinal stretching mode of FIG. 4B or the transverse stretching mode of FIG. 4C, as the case may be.

A few general comments are contained in this paragraph. The spandex material Lycra is mentioned above as a useful elastomeric material but other synthetic materials such as Hytrels, Glospan, and Kraton can be employed as can, also, natural rubber. In order to permit operation in the range from about $-40°$ F. to $+140°$ F., the fibers typically will contain a plasticizer or modifier such as oil, for example, to lower $T_g$, the glass transition temperature. The pre-stressed elastomeric fibers maintain the half spools in thier juxtaposed (i.e., side by side) relationship without need for telescoping or other costly and cumbersome mechanisms to assure accurate relative positioning therebetween. Indeed, the elastomeric fibers provide the sole mechanism to maintain the two half-spools 1A and 1B in FIG. 1 in their facing juxtaposed relationship; this, among other things, makes possible an inexpensive yet reliable device. In addition, as above indicated, the pre-tensioned fibers (in cooperation with the mechanical members) provide the sole support (i.e., static retention) for the bumper in FIGS. 4A–4C; it will be appreciated, in this respect, that the weight of the bumper tends to cause a pivoting action or moment between the mechanical members of each of the devices 101A and 101B about the transverse axis thereof and that pivoting action or moment must be counteracted by the elastomeric fibers or strands which maintain a predetermined high contact pressure between the two juxtaposed rigid members (e.g., steel or aluminum) of a magnitude that the two act as a rigid piece with respect to the pivoting action or moment.

Further modifications of the invention herein disclosed will occur to persons skilled in the art and all such modifications are deemed to be within the scope of the invention as defined by the appended claim.

What is claimed is:

1. An energy absorbing device that comprises two rigid abutting mechanical members that are free to move into facing physical contact with one another and away from such facing physical contact, allowable relative motion between the two mechanical members being longitudinal movement away from and toward each other and substantial transverse motion with resepct to each other;

a plurality of elastomeric fibers disposed in pre-tension to interconnect the two mechanical members to maintain said physical contact and to apply a contact pressure between said mechanical members, the tension forces applied by the elastomeric fibers being of sufficient magnitude to maintain relatively high enough facing contact pressure between the two mechanical members that they act as a rigid piece with respect to moments and forces that below predetermined thresholds tend to separate them from said facing physical contact, said elastomeric fibers in pre-tension being the sole mechanism to maintain the two mechanical members in said facing physical contact with one another and to return the two mechanical members to said facing physical contact when that relationship is changed by both longitudinally-directed forces and laterally-directed forces; and means to transmit both longitudinal and transverse impact forces that tend to separate the two mechanical members from said facing physical contact with each other, thus stretching the elastomeric fibers which serve, when stretched, to convert the impact energy into heat and stored elastic energy within the fibers to absorb impact energy.

2. An energy absorbing device as claimed in claim 1 in which said means to transmit permits acceptance of both longitudinal and transverse components of impact force which are then absorbed by the elastomeric fibers.

3. An energy absorbing device as claimed in claim 1 or claim 2 in which each of the two said mechanical members has a peripheral recess to receive said elastomeric fibers which are wound in pre-tension therein, the peripheral recess of the two mechanical members registering when the two are in said facing physical contact to form a closed-loop peripheral recess for the elastomeric fibers.

4. An energy absorbing device as claimed in claim 3, wherein the two said mechanical members, when in contact with one another, form a spool.

5. An energy absorbing device as claimed in claim 4 in which the elastomeric fibers are wound in pre-tension as many single turns to form a winding whose cross dimensions are many times greater than the cross dimensions of the individual fibers.

6. An energy absorbing device as claimed in claim 5 in which the cross dimensions of the winding are at least 10 to 100 times the cross dimensions of the individual fibers.

7. An energy absorbing device as claimed in claim 1 or claim 2 wherein said means to transmit comprises a first structural support pivotally attached to one of the two said mechanical members and a second structural support pivotally attached to the other of the two said mechanical members.

8. An energy absorbing device as claimed in claim 7 in which each of the two said mechanical members has a peripheral recess to receive said elastomeric fibers which are wound in pre-tension therein, the peripheral recess of the two mechanical members registering when the two are in said facing contact to form a closed-loop peripheral recess for the elastomeric fibers.

9. An energy absorbing device as claimed in claim 7 wherein the two said mechanical members, when in contact with one another, form a spool.

10. An energy absorbing device as claimed in claim 1 wherein said allowable relative motion includes pivoting motion occasioned by moments about a transverse axis and wherein the material of which the elastomeric fibers are formed has large hysteresis losses.

11. An energy absorbing device as claimed in claim 1 wherein the elastomeric fibers are polyurethane fibers.

12. An energy absorbing device as claimed in claim 1 wherein the material forming the elastomeric fibers is taken from the group of spandex fibers.

13. An energy absorbing device as claimed in claim 1 wherein the fibers are Lycra fibers.

14. An energy absorbing device as claimed in claim 1 in which the pre-tension applied to the elastomeric fibers is sufficient to maintain predetermined high contact pressure between the two juxtaposed mechanical members that the two act as a rigid piece with respect to moments, but not so great that said stretching due to the impact forces will result in fracture of a substantial percentage of the fibers.

15. An energy absorbing device as claimed in claim 14 wherein the elastomeric fibers comprise many single turns and wherein the length of a single turn of fiber under pre-tension is ordinarily greater but may be less than the length added thereto by said stretching.

16. An energy absorbing device as claimed in claim 15 in which each of the two juxtaposed mechanical members is a half spool which form a spool when the two members are in facing physical contact with one another, said fibers being disposed within the peripheral spool slot and providing the sole means to maintain the two mechanical members in their juxtaposed relationship.

17. An energy absorbing device as defined by claim 2 wherein each of the two mechanical members has a peripheral recess so that, when the two members are in said facing physical contact, there is formed a closed-loop peripheral recess to receive said elastomeric fibers which are disposed in pre-tension therein, said elastomeric fibers forming a winding whose cross dimensions are at least 10 to 100 times the cross dimensions of the individual fibers.

18. An energy absorbing device as defined by claim 2 wherein the elastomeric fibers are fine denier elastomeric fibers having high hysteresis losses.

19. An energy absorbing device that comprises a plurality of abutting mechanical members mountable to move relative to one another; and an elastomeric material disposed to interconnect under tension the plurality of mechanical members to maintain said members normally in a predetermined positional relationship, but which, when impact forces are applied to one of said members that changes said positional relationship, converts the impact energy into heat energy and energy stored as elastic energy within said material, said tension being sufficient that the plurality of mechanical members act as a rigid body with respect to moments and other forces below magnitudes that tend to change said predetermined positional relationship, said elastomeric material under tension being the sole mechanism maintaining the mechanical members in said predetermined positional relationship and serving to return the mechanical members to said predetermined positional relationship if said impact forces change that relationship.

20. An energy absorbing device as defined by claim 19 wherein said elastomeric material comprises a winding formed of a large number of fine denier elastomeric fibers in pre-tension.

21. A method of absorbing impact energy, that comprises: providing a plurality of rigid mechanical members in a facing abutting configuration which is changed upon impact which tends to cause the mechanical members to separate from one another, interconnecting the mechanical members by an elastomeric material in tension, which elastomeric material serves as the sole mechanism, that is, static retention, to maintain said members normally in a predetermined facing abutting positional relationship to one another, but which when impact forces are applied to said mechanical members that tend to change the positional relationship, serves as a mechanism to convert the impact energy into heat energy and stored elastic energy.

22. A method of absorbing impact energy, that comprises:
providing a plurality of rigid mechanical members in a configuration which is changed upon impact, interconnecting the mechanical members by an elastomeric fibrous material in tension, which elastomeric fibrous material maintains said members normally in physical contact in a predetermined abutting positional relationship to one another, but which, when impact forces are applied to said mechanical members that tend to change the positional relationship, serves as a mechanism to convert the impact energy into heat energy and energy stored as elastic energy within said elastomeric material, said elastomeric fibrous material in tension providing the sole support, that is, static retention, maintaining the members in physical contact and in said predetermined positional relationship with predetermined high contact pressure between said members and serving to return the members to said predetermined positional relationship if said impact forces change that positional relationship.

23. A vehicle bumper system comprising an energy absorbing device comprising two rigid mechanical members in an abutting configuration, one of the two mechanical members being pivotally secured to the frame of the vehicle and the other of the two members being pivotally secured to a bumper of the vehicle, said device serving to secure the bumper to the frame, said mechanical members being adapted to move relative to one another, said device further including an elastomeric material under pre-tension disposed to interconnect the two abutting mechanical members to maintain the members in a predetermined positional relationship in facing contact with one another, but which, when impact forces are applied that tend to change said positional relationship and separate the two mechanical members from contact with another and stretch the elastomeric material, converts the impact energy into heat energy and stored elastic energy within the elastomeric material, the elastomeric material providing sufficient tensile force to maintain the bumper in its normal physical relationship to the frame and provide the sole support, that is, static retention, therefor.

24. Apparatus comprising two energy absorbing devices as defined by claim 23 connected to secure the bumper to the frame of the vehicle.

25. An apparatus as claimed in claim 24 in which the elastomeric material comprises many elastomeric strands disposed in pre-tension as many single turns to form a winding whose cross dimensions are many times greater than the cross dimensions of the individual strands.

26. Apparatus as claimed in claim 24 in which the elastomeric material comprises many fine denier elastomeric fibers disposed in pre-tension as many single turns to form a winding whose cross dimensions are many times greater than the diameter of the individual fibers.

27. Apparatus as claimed in claim 23 in which said mechanical members comprise two half-spools which, in each device, form a single spool and in which the elastomeric material comprises at least several strands of elastomer disposed in pre-tension in the peripheral recess of the spool.

28. In a vehicle having a frame and a bumper, two energy absorbing devices that serve to secure the bumper to the frame and provide substantially the sole support therefor, each device comprising two abutting mechanical members, one of the two mechanical members being secured to the frame of the vehicle and the other of the two members being secured to the bumper of the vehicle, said mechanical members being adapted to move relative to one another, said device further including an elastomeric material under pre-tension disposed to interconnect the two mechanical members to maintain the members in a predetermined positional relationship, but which, when impact forces are applied that change said positional relationship, stretches to convert the impact energy into heat energy and energy stored as elastic energy within the elastomeric material, said pre-tension being of sufficient magnitude to maintain the bumper in its normal physical relationship to the frame in the absence of impact, said elastomeric material of the two devices serving under said pretension to provide the sole support for the bumper, each said device acting as a rigid piece about its transverse axis with respect to moments and forces exerted by the bumper weight.

29. Apparatus as claimed in claim 28 wherein said two mechanical members are half-spools which unite in the device to form a spool having a peripheral closed-loop recess or indentation to receive the elastomeric material in pre-tension.

30. Apparatus as claimed in claim 29 wherein the elastomeric material comprises at least several strands of elastomer disposed in the peripheral closed-loop recess or indentation.

31. Apparatus as claimed in claim 30 wherein the elastomeric material comprises many fine denier strands wound to a predetermined tension within the peripheral closed-loop recess or indentation.

32. Apparatus as claimed in claim 31 wherein one of the two members is pivotally secured to the frame of the vehicle and the other of the two members is pivotally secured to the bumper of the vehicle to permit each energy absorbing device to absorb energy from transverse impact forces as well as longitudinal impact forces.

33. Apparatus as claimed in claim 28 wherein one of the two members is pivotally secured to the frame of the vehicle to permit each energy absorbing device to absorb energy from transverse impact forces as well as longitudinal impact forces.

34. An energy absorbing device that comprises
two abutting mechanical members that are free to move into physical contact with one another and away from such physical contact;
a winding comprising many fine denier elastomeric fibers disposed in pre-tension to interconnect the two mechanical members to maintain said physical contact and to apply a contact pressure between said mechanical members, said winding being the sole mechanism maintaining the positional relationship of the two abutting mechanical members; and
means to transmit impact forces to separate the two mechanical members from each other, thus stretching the fine denier elastomeric fibers which act, when stretched, to convert the impact energy into heat and stored elastic energy within the fibers to absorb impact energy.

35. An energy absorbing device as defined by claim 34 wherein said winding is formed of thousands of individual elastomeric fibers, the material forming the individual fibers having high hysteresis to effect large heat losses when stretched.

* * * * *